(12) United States Patent
Majima

(10) Patent No.: US 7,804,891 B2
(45) Date of Patent: Sep. 28, 2010

(54) DEVICE AND METHOD FOR JUDGING COMMUNICATION QUALITY AND PROGRAM USED FOR THE JUDGMENT

(75) Inventor: Taichi Majima, Yokohama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 1017 days.

(21) Appl. No.: 10/594,985

(22) PCT Filed: Mar. 30, 2005

(86) PCT No.: PCT/JP2005/006704

§ 371 (c)(1),
(2), (4) Date: Sep. 29, 2006

(87) PCT Pub. No.: WO2005/096537

PCT Pub. Date: Oct. 13, 2005

(65) Prior Publication Data

US 2007/0217494 A1 Sep. 20, 2007

(30) Foreign Application Priority Data

Mar. 31, 2004 (JP) .............................. 2004-108399

(51) Int. Cl.
*H03H 7/30* (2006.01)
(52) U.S. Cl. ........................ 375/227; 375/264; 375/269; 375/335; 375/260; 714/776; 714/774; 714/795; 714/796
(58) Field of Classification Search ................ 714/776, 714/774, 795, 796; 375/264, 227, 260, 269, 375/334, 335, 375
See application file for complete search history.

(56) References Cited

U.S. PATENT DOCUMENTS 5,432,778 A * 7/1995 Minde et al. ................ 370/347

(Continued)

FOREIGN PATENT DOCUMENTS

CN 1484907 3/2004

(Continued)

OTHER PUBLICATIONS

International Search Report for PCT/JP2005/006704.

(Continued)

*Primary Examiner*—David C Payne
*Assistant Examiner*—Rahel Guarino
(74) *Attorney, Agent, or Firm*—Eric J. Robinson; Robinson Intellectual Property Law Office, P.C.

(57) ABSTRACT

A device and method for effectively judging a communication quality in a communication system and a program used for the judgment. A communication device generates a four-value FSK symbol by adding a redundant bit to a bit of the most important part of encoded audio data. The symbol containing the redundant bit is set so that the symbol value is the maximum value of the minimum value of the four values which may be obtained. A reception device R receives the FSK modulation wave, restores the symbol, counts the number of redundant bits contained in the restored symbol and having incorrect values, decides whether to perform a bad frame masking process and what kind of bad frame masking process is to be performed, and executes the decided process. Thus, it is possible to accurately or rapidly judge the communication quality with a simple configuration.

9 Claims, 8 Drawing Sheets

U.S. PATENT DOCUMENTS

| | | |
|---|---|---|
| 6,512,748 B1 | 1/2003 | Mizuki et al. |
| 6,519,740 B1 * | 2/2003 | Mårtensson et al. ......... 714/822 |
| 7,168,031 B2 * | 1/2007 | Burkert et al. .............. 714/790 |

FOREIGN PATENT DOCUMENTS

| | | |
|---|---|---|
| CN | 1516945 | 7/2004 |
| EP | 1 363 437 | 11/2003 |
| EP | 1 453 263 | 9/2004 |
| JP | 05-260021 | 10/1993 |
| JP | 05-284147 | 10/1993 |
| JP | 11-220762 | 8/1999 |
| JP | 3305644 | 7/2002 |
| JP | 2003-099096 | 4/2003 |
| JP | 2003-174485 | 6/2003 |
| JP | 2003-338851 | 11/2003 |
| JP | 3591726 | 11/2004 |
| KR | 10-2004-0069964 | 8/2004 |
| WO | WO 03/019893 | 3/2003 |
| WO | WO 03/049392 | 6/2003 |

OTHER PUBLICATIONS

International Preliminary Examination Report (Application No. PCT/JP2005/006704) dated Oct. 26, 2006.

Official Action (Application No. JP 2004-108399) dated Sep. 9, 2008.

* cited by examiner

DEVICE AND METHOD FOR JUDGING COMMUNICATION QUALITY AND PROGRAM USED FOR THE JUDGMENT

TECHNICAL FIELD

The present invention relates to a device and method for judging communication quality in a communication system, and a program for causing a computer to execute the judgment.

BACKGROUND ART

In technologies for transmitting voice data, there has been used a technique that encodes voices by means of a vocoder to transmit them such as, for example, that described in a prior document, "PERSONAL DIGITAL CELLULAR TELECOMMUNICATION SYSTEM RCR STD-27 Revision J," by Association of Radio Industries and Businesses, May 30, 2002. Recently, with the development of encoding technologies, sufficiently natural voices can be transmitted in real time even at a much low bit rate on the order of 2000 [bps] or less, using a small amount of code: this technique has also been used in such applications that must use a transmission channel whose communication quality is not necessarily good, such as an automobile telephone system.

When voice data is transmitted at a low bit rate, a small amount of bit errors may have serious effects on the quality, and therefore, it is essential to accurately detect or correct the errors.

In doing so, there has been used a technique, for example, in which a device that transmits voice data adds cycle redundancy check (CRC) codes to the coded voices, and a receiving device uses the CRC codes to correct errors.

However, in case of voice data that is small in the amount of the data, and when the number of bits of the CRC codes is given so as to ensure sufficient sound quality while the communication quality of the transmission channel remains within a normal range, the redundancy of the voice data will be excessively increased, and it will be difficult to achieve real time voice transmission.

As a technique to solve the problem, it is conceivable that communication quality of the transmission channel is to be judged and only transmitted voice data in a good condition in terms of the communication quality is to be used (specifically, for example, voices to be reproduced from transmitted voice data in poor communication quality are muted, etc.).

As a technique to judge communication quality, it is conceivable that, for example, when a sequence of symbols representative of coded voices are transmitted in the frequency shirt keying (FSK) modulated form, a receiving device measures an instantaneous value at a Nyquist point (where instantaneous values of the baseband signal are converged on any of multiple predetermined ideal values representative of symbols (the ideal value is also referred to as symbol value)) of the baseband signal obtained by demodulating the received FSK modulated wave, and judges the communication quality based on the difference between the measured value and the ideal value.

However, sufficiently fine level of sampling of the baseband signal and subsequent complex calculation are required to determine the difference between the measured instantaneous value of the baseband signal at a Nyquist point and the ideal value. This results in a complex construction of the device that receives the voice data, and it will be difficult to achieve real time voice transmission.

As another technique, it is also conceivable that, for example, when voice data has been subjected to the forward error correction (FEC), communication quality is to be judged on the receiving side of the voice data based on the number of error corrections identified in the process of error correction.

However, the process of providing the FEC, and the process of correcting errors in the voice data that has been subjected to the FEC are both complex. This results in a complex construction of the devices that transmit and receive the voice data, and it will be difficult to achieve real time voice transmission. In addition, the number of error corrections has a predetermined upper limit, and if the number of erroneous bits exceeds the upper limit, the number of erroneous bits cannot accurately be known based on the number of error corrections. Therefore, accurate judgment of the communication quality cannot be achieved.

As yet another technique, it is also conceivable that, for example, when voice data is wirelessly transmitted, the electric field strength of the voice data is to be measured and communication quality is to be judged based on the measured result, on the receiving side of the voice data.

However, if the voice data is mixed with noises, apparent electric field strength may increase and cause a high risk of errors in judgment of the communication quality. It is also conceivable that, for example, moving averages on a number of voice data are to be determined for use in measuring the electric field strength. In this case, however, it takes time to judge the communication quality, and multiple transmissions are required for the same voice data; it will be difficult to achieve real time voice transmission.

As yet another technique, it is also conceivable that, for example, communication quality is to be judged based on an ON or OFF state of squelch, assuming that the squelch circuit or the like is provided on the receiving side of voice data.

However, if the voice data is mixed with noises, the squelch may be incorrectly opened and in such a case, there is a high risk of errors in judgment of the communication quality. Additionally, in case where moving averages on a number of the voice data are determined in order to increase relative strength of the voice data to be received, it will be difficult to achieve real time voice transmission, as is the case with the above technique that uses a measured result of the electric field strength.

DISCLOSURE OF THE INVENTION

The present invention has been made in view of the conventional problems as described above, and it is an object thereof to provide a communication quality judging device, communication quality judging method, and computer program, for accurately or rapidly judging the communication quality with a simple construction.

To achieve the object, a communication quality judging device according to a first aspect of the invention is essentially composed of: a symbol judging means for obtaining a baseband signal representative of a sequence of multilevel symbols and judging the symbol represented by the baseband signal; and a communication quality judging means for judging communication quality of a transmission channel over which the baseband signal has been transmitted, based on content of the symbol judged by the symbol judging means.

At least a portion of a bit string is distinguished as a protected portion, the bit string constituting data to be transmitted represented by the sequence of symbols, and at least a portion of the symbol that belongs to the sequence of symbols contains a bit belonging to the protected portion and a redundant bit having a predetermined value.

The communication quality judging means operatively identifies the number of redundant bits having the predetermined value or the number of redundant bits missing the predetermined value among the redundant bits contained in the symbol that contains a bit belonging to the protected portion, and judges the communication quality of the transmission channel based on the identified result.

The communication quality judging device may be further provided with a data changing means for, if the communication quality judged by the communication quality judging means does not satisfy a predetermined condition, making a predetermined change to the data to be transmitted represented by the symbol used in the judgment.

The data changing means may be provided with means for externally obtaining a parameter that defines at least a portion of the condition.

The predetermined change may include a process of substantially destroying the data to be transmitted represented by the symbol used to judge that the communication quality does not satisfy a predetermined condition.

The predetermined change may include a process of replacing the data to be transmitted represented by the symbol used to judge that the communication quality does not satisfy a predetermined condition, with previous data represented by a symbol previously obtained by the symbol judging means.

The predetermined change may further include a process of substantially destroying the data to be transmitted that follows last replaced data and that is represented by the symbol used to judge that the communication quality does not satisfy a predetermined condition, when more than a predetermined number of replaced data continues.

The data to be transmitted may be composed of data representative of strength of a variable, and the predetermined change may include an attenuating process of changing the data to be transmitted represented by the symbol used to judge that the communication quality does not satisfy a predetermined condition, to a data equivalent in which the variable represented by the data is attenuated.

When first data, which is transmitted immediately before second data to be subjected to the attenuating process, has been subjected to the attenuating process, the attenuating process provided to the second data may consist of a process of changing the second data to a data equivalent in which the variable represented by the second data is attenuated at an attenuation ratio larger than that for the variable represented by the first data.

A communication quality judging method according to a second aspect of the invention includes: a symbol judging step of obtaining a baseband signal representative of a sequence of multilevel symbols and judging the symbol represented by the baseband signal; and a communication quality judging step of judging communication quality of a transmission channel over which the baseband signal has been transmitted, based on content of the symbol judged in the symbol judging step.

At least a portion of a bit string is distinguished as a protected portion, the bit string constituting data to be transmitted represented by the sequence of symbols, and at least a portion of the symbol that belongs to the sequence of symbols contains a bit belonging to the protected portion and a redundant bit having a predetermined value. In the communication quality judging step, the number of redundant bits having the predetermined value or the number of redundant bits missing the predetermined value is identified among the redundant bits contained in the symbol that contains a bit belonging to the protected portion, and the communication quality of the transmission channel is judged based on the identified result.

A computer program according to a third aspect of the invention causes a computer to perform: a symbol judging step of obtaining a baseband signal representative of a sequence of multilevel symbols and judging the symbol represented by the baseband signal; and a communication quality judging step of judging communication quality of a transmission channel over which the baseband signal has been transmitted, based on content of the symbol judged in the symbol judging step.

The program causes the computer to operate such that at least a portion of a bit string is distinguished as a protected portion, the bit string constituting data to be transmitted represented by the sequence of symbols, and at least a portion of the symbol that belongs to the sequence of symbols contains a bit belonging to the protected portion and a redundant bit having a predetermined value, and the communication quality judging step identifies the number of redundant bits having the predetermined value or the number of redundant bits missing the predetermined value among the redundant bits contained in the symbol that contains a bit belonging to the protected portion, and judges the communication quality of the transmission channel based on the identified result.

According to the present invention, there are provided a communication quality judging device, communication quality judging method, and computer program, for accurately or rapidly judging the communication quality with a simple construction.

BEST MODE FOR CARRYING OUT THE INVENTION

Hereafter, embodiments according to the invention will specifically be described in conjunction with an example of a voice transmitting and receiving system, with reference to the drawings.

Figure 1:
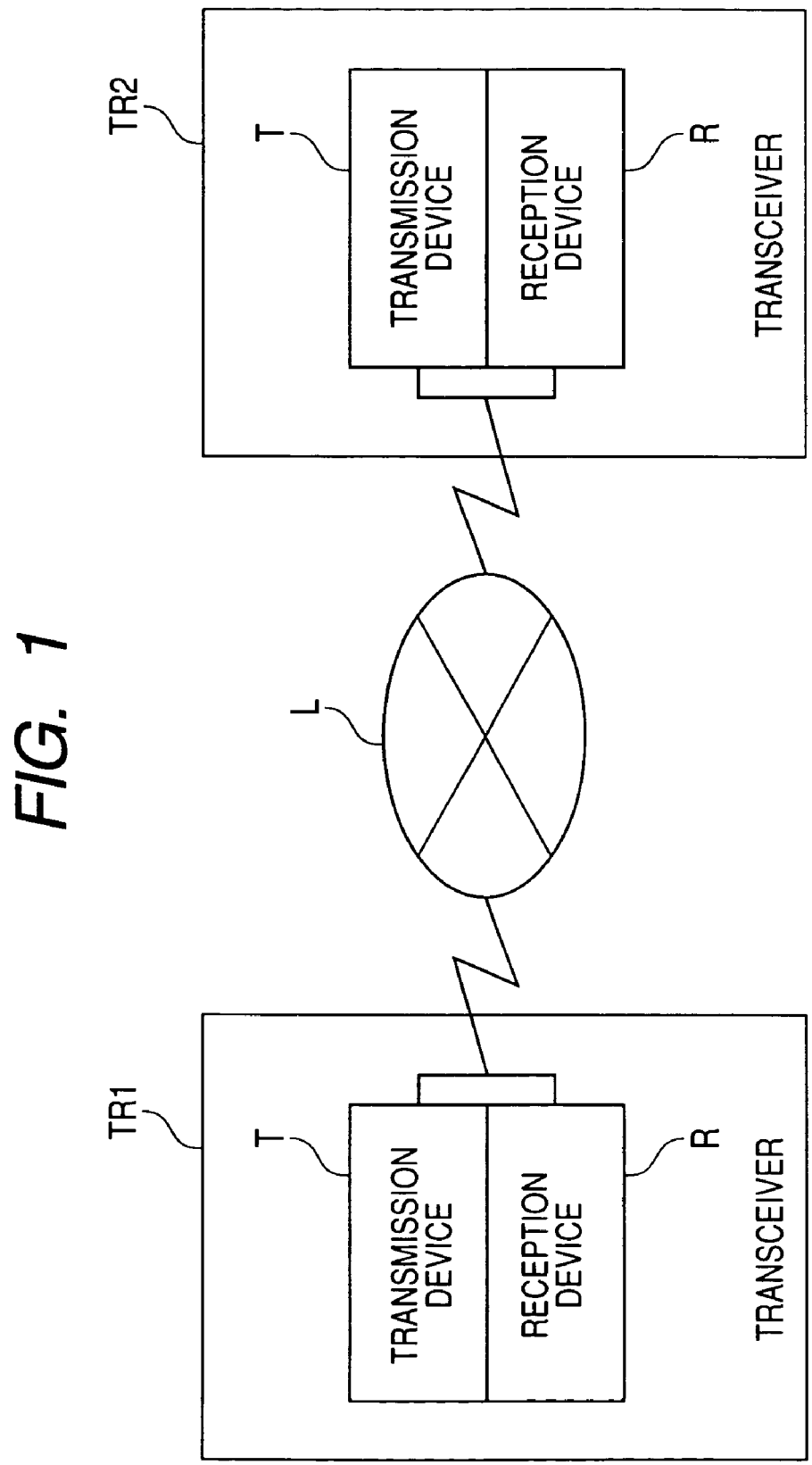
FIG. 1 is a block diagram showing an arrangement of a voice transmitting and receiving system according to an embodiment of the invention.

FIG. 1 shows an arrangement of a voice transmitting and receiving system according to an embodiment of the invention. As shown, the voice transmitting and receiving system is composed of transceivers TR1 and TR2. The transceivers TR1 and TR2 transmit and receive voices to and from each other over an external transmission channel L, including an external packet network and the like.

The transceivers TR1 and TR2 have a substantially identical arrangement, and each has a transmission device T and a reception device R.

The transmission device T in the transceiver TR1 generates frequency shift keying (FSK) modulated waves representative of voices and transmits them to the reception device R in the transceiver TR2, and the reception device R in the transceiver TR2 receives the FSK modulated waves to reproduce the voices. Similarly, the transmission device T in the transceiver TR2 generates FSK modulated waves representative of voices and transmits them to the reception device R in the transceiver TR1, and the reception device R in the transceiver TR1 receives the FSK modulated waves to reproduce the voices.

The transmission devices T in the transceivers TR1 and TR2 have a substantially identical arrangement, and the reception devices R in the transceivers TR1 and TR2 also have a substantially identical arrangement.

However, it is intended that each of the transceivers TR1 and TR2 has an arrangement such that FSK modulated waves transmitted from its own transmission device T are not received by its own reception device R. Specifically, for example, it is conceivable that the transmission frequency of the transmission device T in the transceiver TR1 (or TR2) and the reception frequency of the reception device R may be different from each other. Alternatively, the transceivers TR1 and TR2 may be adapted to add an identification of the source and/or destination to the FSK modulated waves transmitted by their own transmission device T, while their own reception device R handles only the FSK modulated waves that have its own identification appended as a destination, or the FSK modulated waves that lack its own identification as a source, as an object from which voices are reproduced. Alternatively, each of the transceivers TR1 and TR2 may have a well known facility that performs a press-to-talk (PTT) function such that its own reception device R stops receiving the FSK modulated waves while its own transmission device T is transmitting the FSK modulated waves. (In this case, however, the transceivers TR1 and TR2 will communicate with each other in half duplex operation.)

Figure 2:
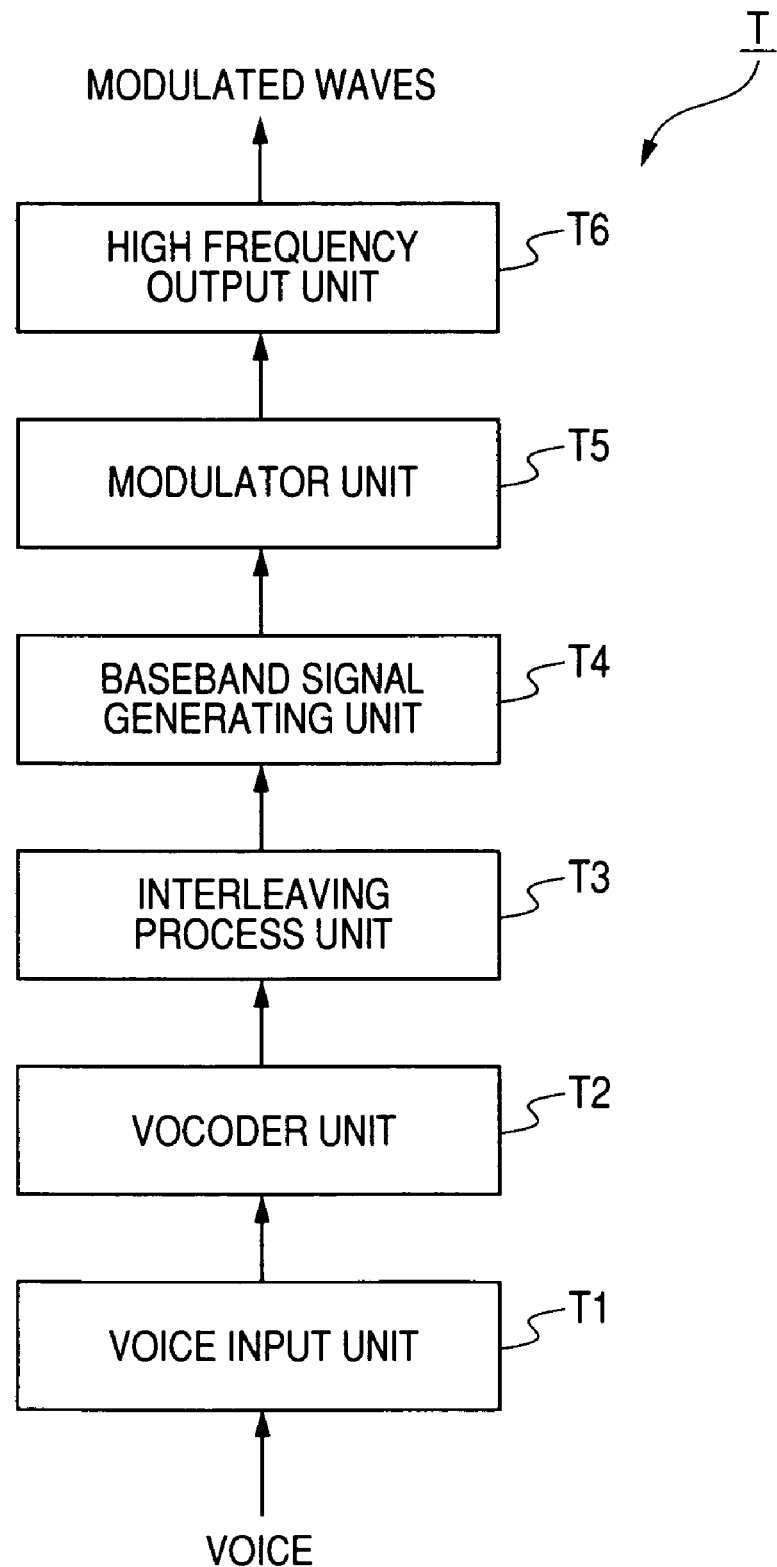
FIG. 2 is a block diagram showing an arrangement of a transmission device.

As shown in FIG. 2, each transmission device T in the transceivers TR1 and TR2 is composed of a voice input unit T1, a vocoder unit T2, an interleaving process unit T3, a baseband signal generating unit T4, a modulator unit T5, and a high frequency output unit T6.

The voice input unit T1 is composed of, for example, a microphone, an audio frequency (AF) amplifier, a sampler, an analog-to-digital (A/D) converter, a logic circuit for frame generation, and the like.

The voice input unit T1, for example, collects voices to generate a voice signal representative of the voices in an analog format, amplifies the voice signal, and samples and converts from analog to digital the voice signal so as to generate voice data in a digital format. The voice data in a digital format is fragmented into a sequence of multiple frames and provided to the vocoder unit T2.

Each frame generated in the voice input unit T1 consists of waves that correspond to one sound fragment obtained by dividing the voices collected by the voice input unit T1 at a constant frequency (for example, for every 20 milliseconds).

Each of the vocoder unit T2, interleaving process unit T3, and baseband signal generating unit T4 is composed of a processor such as a digital signal processor (DSP) and a central processing unit (CPU), a memory that stores a program executed by the processor, and the like. Some or all functions of the vocoder unit T2, interleaving process unit T3, and baseband signal generating unit T4 may be implemented in a single processor. The processor that implements some or all functions of the vocoder unit T2, interleaving process unit T3, and baseband signal generating unit T4 may further implement functions of the logic circuit for frame generation in the voice input unit T1.

Supplied with frames by the voice input unit T1, the vocoder unit T2 generates vocoder output data for each provided frame using the frame, and provides it to the interleaving process unit T3 in a manner that each frame can be identified in order in the sequence of the frames described above. (Specifically, for example, each frame may be sequentially provided according to the order, or data representative of the frame order may be provided along with the frames.)

Figure 3:
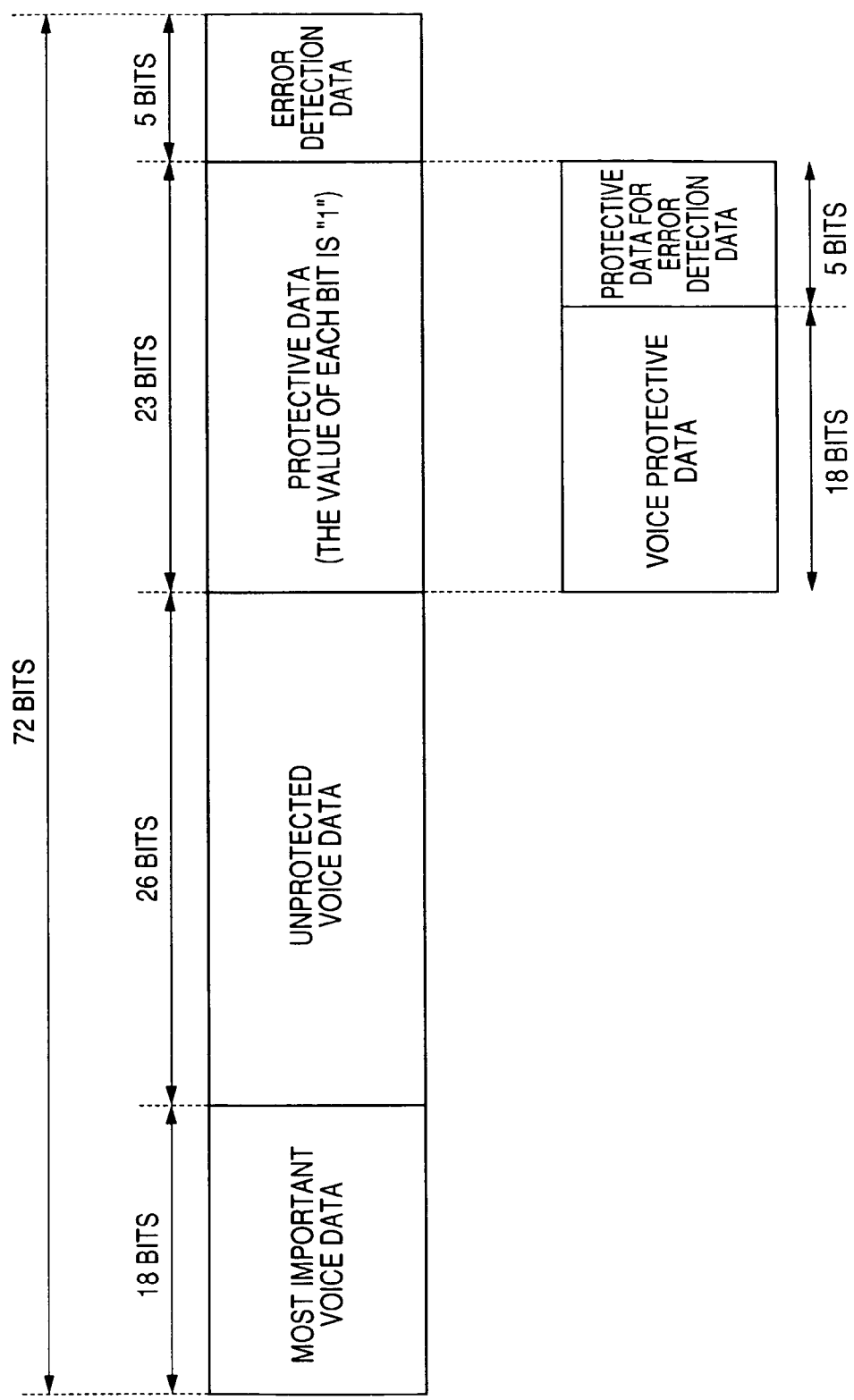
FIG. 3 shows a data structure of vocoder output data.

As shown in a data structure of FIG. 3, each of the vocoder output data includes, for example, most important voice data of 18 bits, unprotected voice data of 26 bits, protective data of 23 bits, and error detection data of 5 bits.

The most important voice data in the vocoder output data is composed of an 18-bit portion that is detected according to predetermined criteria and is acoustically the most important among 44-bit data (hereinafter referred to as encoded voice data) obtained by encoding the sound fragment represented by the frame used to generate the vocoder output data. The unprotected voice data in the vocoder output data is composed of a 26-bit portion that is acoustically the second important after the portion of the most important voice data among the encoded voice data.

The encoded voice data is composed of bits associated with components that may be contained in voices (for example, sound pressure, pitch, and the like), and if each of the bits takes a predetermined value (for example, a value of "1"), it indicates that the component associated with the bit is substantially absent from the sound fragment represented by the encoded voice data that contains the bit.

In the technique for encoding a sound fragment by the vocoder unit T2, it is required to identify, according to predetermined criteria, the acoustical importance of each bit that constitutes resulting data from encoding, and to allocate it to any of the most important voice data, unprotected voice data, and other data. However, any technique for encoding a sound fragment by the vocoder unit T2 may be used provided that such allocation is possible. Specifically, the vocoder unit T2 may use a technique such as, for example, the linear predictive coding to perform the encoding. In this case, the vocoder unit T2 may identify the acoustical importance according to well known criteria as found in the prior art document as described above.

On the other hand, the protective data in the voice data is composed of voice protective data of 18 bits and protective data for error detection data of 5 bits, and the value of any bit constituting the voice protective data and protective data for error detection data is "1."

The error detection data in the vocoder output data is composed of cycle redundancy check (CRC) data for detecting errors in the most important voice data, which is obtained by using the most important voice data contained in the vocoder output data.

The interleaving process unit T3 interleaves the vocoder output data provided by the vocoder unit T2, and provides the interleaved vocoder output data (hereinafter referred to as interleaved frame) to the baseband signal generating unit T4.

Figure 4:
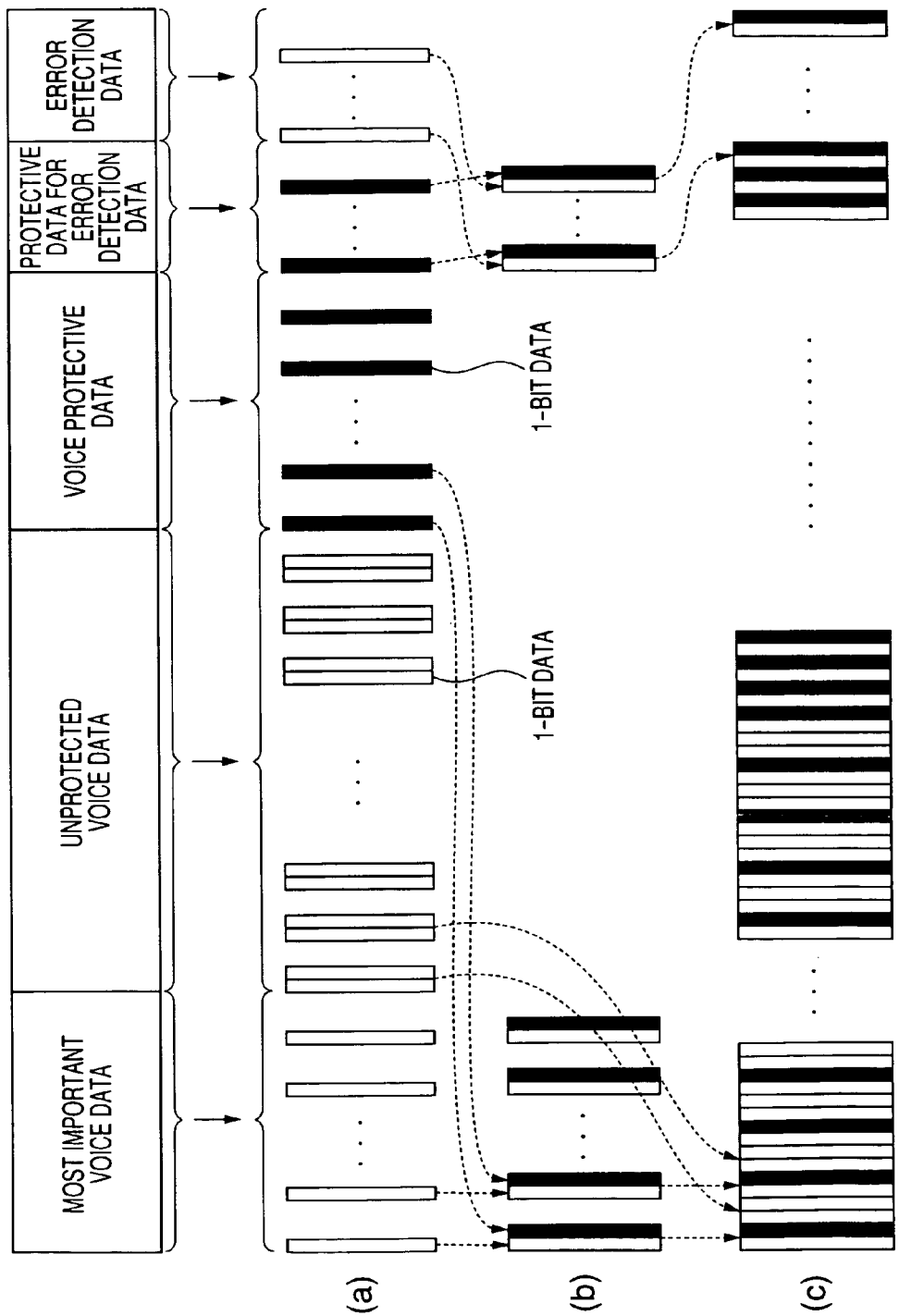
FIG. 4 schematically shows a process of interleaving vocoder output data.

That is, supplied with the vocoder output data by the vocoder unit T2, the interleaving process unit T3 first generates 2-bit data corresponding to a symbol in a four-value FSK, based on the vocoder output data. Specifically, as also shown in FIG. 4 for example, the interleaving process unit T3 performs the following processes indicated as (A1) to (A3):

(A1) The interleaving process unit T3 combines each bit that constitutes the most important voice data contained in the vocoder output data with each bit that constitutes the voice protective data one by one to generate 18 pieces of 2-bit data. However, as shown in FIG. 4(b), the combination of any of these 18 pieces of data is such that the bit that constitutes the voice protective data is located at the lower bit.

(A2) The interleaving process unit T3 combines each bit that constitutes the error detection data contained in the vocoder output data with each bit that constitutes the protective data for error detection data one by one to generate 5 pieces of 2-bit data. However, as shown in FIG. 4(b), the combination of any of these 5 pieces of data is such that the bit that constitutes the protective data for error detection data is located at the lower bit.

(A3) The interleaving process unit T3 fragments the unprotected voice data contained in the vocoder output data into 13 pieces of 2-bit data, as shown in FIG. 4(a).

The interleaving process unit T3 then provides a total of 36 pieces of 2-bit data resulted from the processes (A1) to (A3) to the baseband signal generating unit T4 in a predetermined order that, as shown in FIG. 4(c) for example, includes a portion in which the 2-bit data obtained in the process (A1) or (A2) and the 2-bit data obtained in the process (A3) are alternately arranged.

In 2-bit data generated by the interleaving process unit T3 performing the processes described above, any of those obtained from the error detection data and protective data for error detection data, as well as those obtained from the most important voice data and voice protective data will have "1" in the lower one digit. In contrast, the 2-bit data obtained from the unprotected voice data may have either "0" or "1" in the lower one digit.

Supplied with the interleaved frame by the interleaving process unit T3, the baseband signal generating unit T4 converts the interleaved frame into a baseband signal in the four-value Root Nyquist FSK, and provides the baseband signal to the modulator unit T5. The baseband signal generating unit T4 may, for example, insert a marker into the baseband signal to identify the beginning and end of a portion representative of one interleaved frame.

Figure 5:
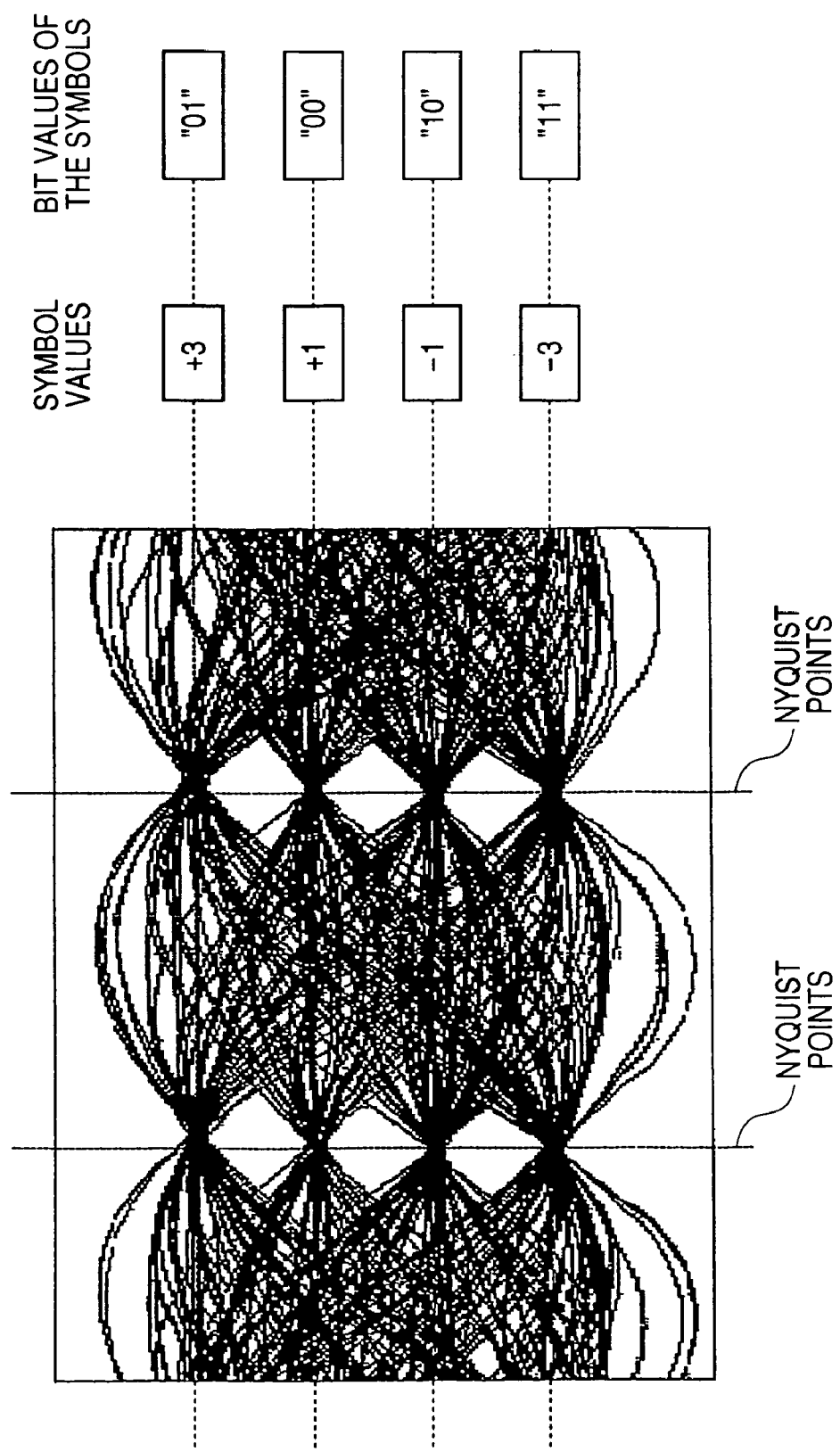
FIG. 5 is a graphical representation showing an eye pattern example of a baseband signal.

FIG. 5 shows an eye pattern example of a baseband signal generated by the baseband signal generating unit T4. As shown, in the baseband signal, the instantaneous values converge on any of four values at a point of constant phase (Nyquist point) in one symbol section (a section representative of information corresponding to one symbol). Assuming that the value of the second one in descending order is (+1), these four values (hereinafter referred to as symbol value) are arranged and equally spaced, for example, with the value of (+3), (+1), (−1), and (−3) respectively in descending order, as shown in FIG. 5.

Assume that, as shown in FIG. 5 for example, the baseband signal generating unit T4 converts a symbol "11" contained in the interleaved frame (i.e. 2-bit data having a value of "11") into a symbol section having a symbol value of (−3), converts a symbol "10" into a symbol section having a symbol value of (−1), converts a symbol "00" into a symbol section having a symbol value of (+1), and converts a symbol "01" into a symbol section having a symbol value of (+3).

As a result of conversion from the interleaved frame to the baseband signal being performed according to the rule described above, a symbol having "1" in the lower one digit is converted into a symbol section having a symbol value of (−3) or (+3). Therefore, any symbol representative of the most important voice data and error detection data will be converted into a symbol section having a symbol value of (+3) or (−3). In contrast, any symbol representative of the unprotected voice data may be converted into a symbol section taking a value of either (+3), (+1), (−1), or (−3).

As apparent from the above, when the interleaved frame is converted into the baseband signal according to the rule described above, these four types of symbols are arranged in descending (or ascending) order in terms of the symbol value to form a series of Gray code (i.e. any Hamming distance between adjacent symbols in the series is "1").

The modulator unit T5 is composed of a well known frequency modulation circuit, an oscillator circuit that generates carrier waves, and the like, and it uses the baseband signal provided by the baseband signal generating unit T4 to frequency modulate the carrier waves, and provides resulting FSK (Root Nyquist FSK) modulated waves to the high frequency output unit T6.

The modulator unit T5 may also be composed of a processor, a memory that stores a program executed by the processor, and the like. The processor that implements some or all functions of the voice input unit T1, the vocoder unit T2, interleaving process unit T3, and baseband signal generating unit T4 may further implement functions of the modulator unit T5.

The high frequency output unit T6 is composed of a high frequency amplifier, an antenna, and the like, and it amplifies the modulated waves provided by the modulator unit T5 and send them to the transmission channel L.

The transmission device T performs operations as described above to generate and transmit the FSK modulated waves that are representative of voices collected by itself and have Root Nyquist characteristics.

Symbols represented by the baseband signal of the FSK modulated waves may be categorized into a first type of symbol, which is representative of the most important portion of an encoded voice data or an error detection data for the most important portion, and a second type of symbol, which is representative of other portions than the most important portion of an encoded voice data. The symbol value of the symbol section representative of the first type of symbol is the maximum or minimum value of four symbol values that may be taken by the symbol section of the baseband signal. Therefore, referring only to the first type of symbol, a bit constituting the most important portion of encoded voice data or error detection data for it has a redundant bit added thereto, so that there are two possible symbol values while the interval between symbol values is substantially increased, thereby improving the signal-to-noise ratio.

The transmission device T in the embodiment as described above generates a baseband signal to include a portion in which a symbol section representative of the first type of symbol and a symbol section representative of the second type of symbol are alternately arranged, so that more important, first type symbols are dispersed in the baseband signal. Therefore, if the transmitted modulated waves are affected by fading and the like, it is less likely to cause a risk of losing a large number of more important, first type symbols at a time.

Figure 6:
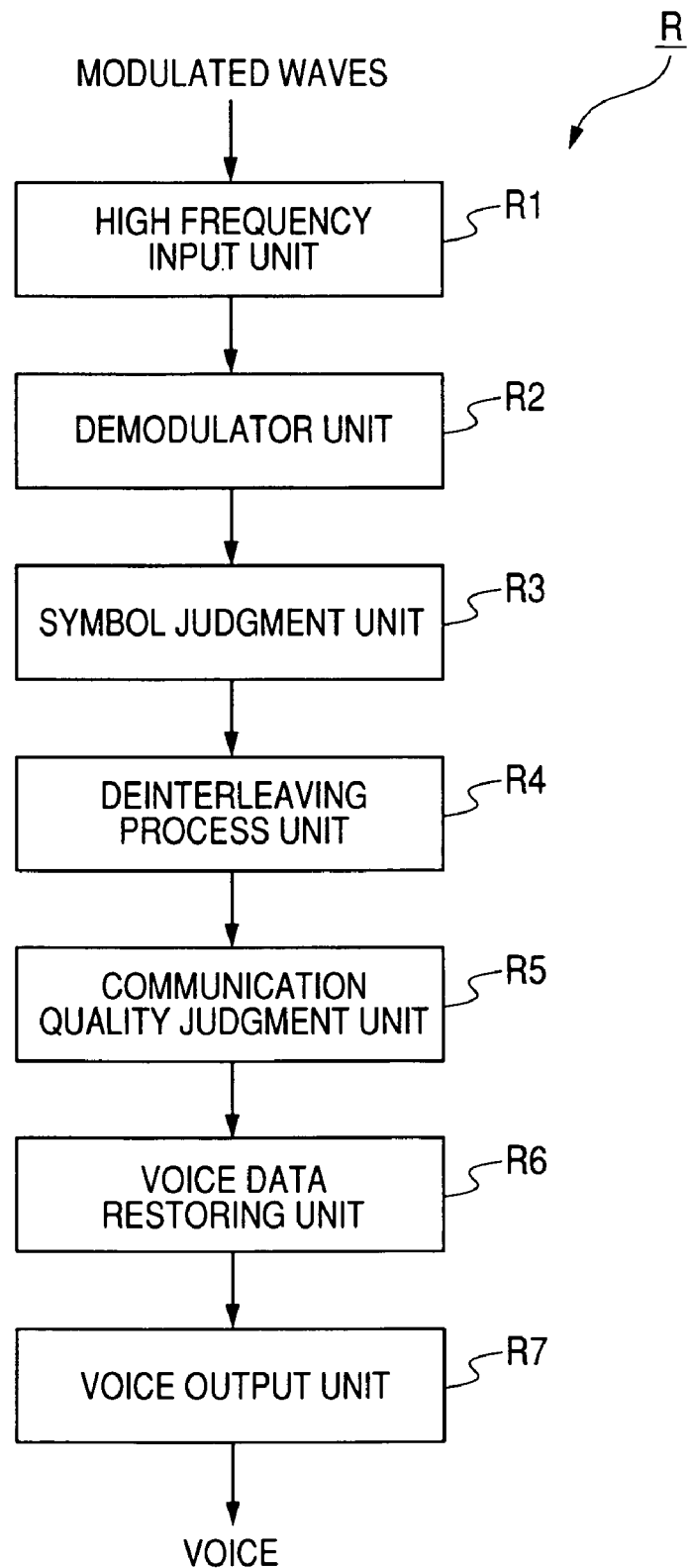
FIG. 6 is a block diagram showing an arrangement of a reception device.

Turning now to the reception device R, as shown in FIG. 6, each reception device R in the transceivers TR1 and TR2 is composed of a high frequency input unit R1, a demodulator unit R2, a symbol judgment unit R3, a deinterleaving process unit R4, a communication quality judgment unit R5, a voice data restoring unit R6, and voice output unit R7.

The high frequency input unit R1 is composed of an antenna, a tuning circuit, and a high frequency amplifying circuit, and it receives from the transmission channel L, the FSK modulated waves sent by a transmission device T and the like onto the transmission channel L, and amplifies and provides them to the demodulator unit R2. A single antenna provided on the transceivers TR1 or TR2 may combine functions of the antenna for the high frequency input unit R1 and the antenna for the high frequency output unit T6 in the transceiver.

The demodulator unit R2 is composed of a well known detection circuit for detecting the frequency modulated waves, and it detects the FSK modulated waves provided by the high frequency input unit R1 to restore the baseband signal. It then provides the restored baseband signal to the symbol judgment unit R3. The demodulator unit R2 may be composed of a processor, a memory that stores a program executed by the processor, and the like.

Each of the symbol judgment unit R3, deinterleaving process unit R4, communication quality judgment unit R5, and voice data restoring unit R6 is composed of a processor, a memory that stores a program executed by the processor, and the like. Some or all functions of the symbol judgment unit R3, deinterleaving process unit R4, communication quality judgment unit R5, and voice data restoring unit R6 may be implemented in a single processor. The processor that implements some or all functions of the demodulator unit R2 or transmission device T may further implement some or all functions of the symbol judgment unit R3, deinterleaving process unit R4, communication quality judgment unit R5, and voice data restoring unit R6.

Figure 7:
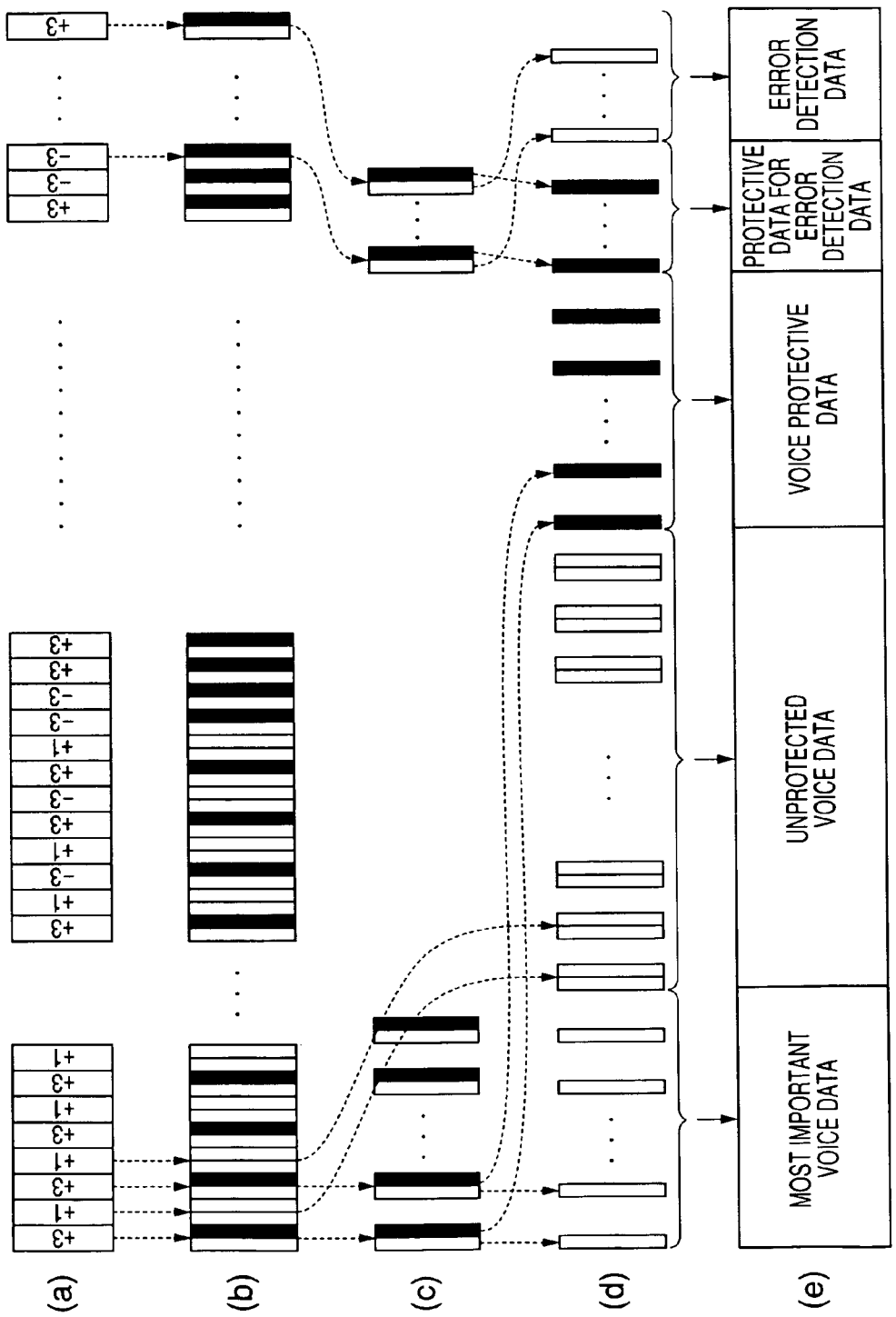
FIG. 7 schematically shows a process of restoring a vocoder output data from a baseband signal.

Based on a instantaneous value at a Nyquist point of each of baseband signals provided by the demodulator unit R2, the symbol judgment unit R3, as shown schematically in (a) and (b) of FIG. 7, judges the symbol represented by a symbol section containing the Nyquist point and, based on the judgment, reproduces data (FIG. 7 (*b*)) corresponding to the interleaved frame generated by the interleaving process unit T3 in the transmission device T. The reproduced data is then provided to the deinterleaving process unit R4.

Specifically, the symbol judgment unit R3 first, for example, determines whether the instantaneous value of the baseband signal at the Nyquist point is not less than a first threshold (Th+), or not less than a second threshold (Th0) and less than (Th+), or not less than a third threshold (Th−) and less than (Th0), or less than (Th−), for each Nyquist point contained in the baseband signals provided by the demodulator unit R2.

At this time, the value of (Th+) is more than (+1) and less than (+3), the value of (Th0) is more than (−1) and less than (+1), and the value of (Th−) is more than (−3) and less than (−1). Specifically, therefore, the value of (Th+) may, for example, be (+2), the value of (Th0) may, for example, be (0), and the value of (Th−) may, for example, be (−2).

If it is judged that the instantaneous value of the baseband signal at the Nyquist point is greater than or equal to (Th+), the symbol judgment unit R3 then judges that the symbol value of the symbol section containing the Nyquist point is (+3) and therefore the symbol section represents symbol "01."

Similarly, if it is judged that the value is not less than (Th0) and less than (Th+), the unit judges that the symbol value of the symbol section containing the Nyquist point is (+1) and therefore the symbol section represents symbol "00." If it is judged that the value is not less than (Th−) and less than (Th0), the unit also judges that the symbol value of the symbol section containing the Nyquist point is (−1) and therefore the symbol section represents symbol "10." If it is judged that the value is less than (Th−), the unit also judges that the symbol value of the symbol section containing the Nyquist point is (−3) and therefore the symbol section represents symbol "11."

Once all symbols of one interleaved frame are judged, the symbol judgment unit R3 then provides a sequence of these symbols to the deinterleaving process unit R4 as data corresponding to one reproduced interleaved frame.

The deinterleaving process unit R4 considers the data provided by the symbol judgment unit R3 as an interleaved frame, uses the interleaved frame to restore vocoder output data. The unit then provides the restored vocoder output data to the communication quality judgment unit R5.

Specifically, supplied with data corresponding to the interleaved frame by the symbol judgment unit R3, the deinterleaving process unit R4 performs the following processes indicated as (B1) to (B6), as also shown in (b) to (e) in FIG. 7:

(B1) The deinterleaving process unit R4 identifies 13 symbols including unprotected voice data among symbols contained in the interleaved frame provided by the symbol judgment unit R3 as 26-bit unprotected voice data as a whole. The deinterleaving process unit R4 may, for example, identify the type of data contained in the symbols based on the order of the symbols in the interleaved frame.

(B2) The deinterleaving process unit R4 separates each of 18 symbols including the most important voice data into the upper one bit and lower one bit among symbols contained in the interleaved frame. The unit then identifies 18-bit data consisting of 18 pieces of upper one bit data as the most important voice data.

(B3) The deinterleaving process unit R4 identifies 18-bit data consisting of 18 pieces of lower one bit data separated in the process (B2) as the voice protective data.

(B4) The deinterleaving process unit R4 separates each of 5 symbols including the error detection data into the upper one bit and lower one bit among symbols contained in the interleaved frame. The unit then identifies 5-bit data consisting of 5 pieces of upper one bit data as the error detection data.

(B5) The deinterleaving process unit R4 identifies 5-bit data consisting of 5 pieces of lower one bit data separated in the process (B4) as the protective data for error detection data.

(B6) The deinterleaving process unit R4 associates the most important voice data, unprotective voice data, protective data (i.e. voice protective data and protective data for error detection data), and error detection data identified in the processes (B1) to (B5) with each other, and provides them to the communication quality judgment unit R5 as data corresponding to the vocoder output data.

Figure 8:
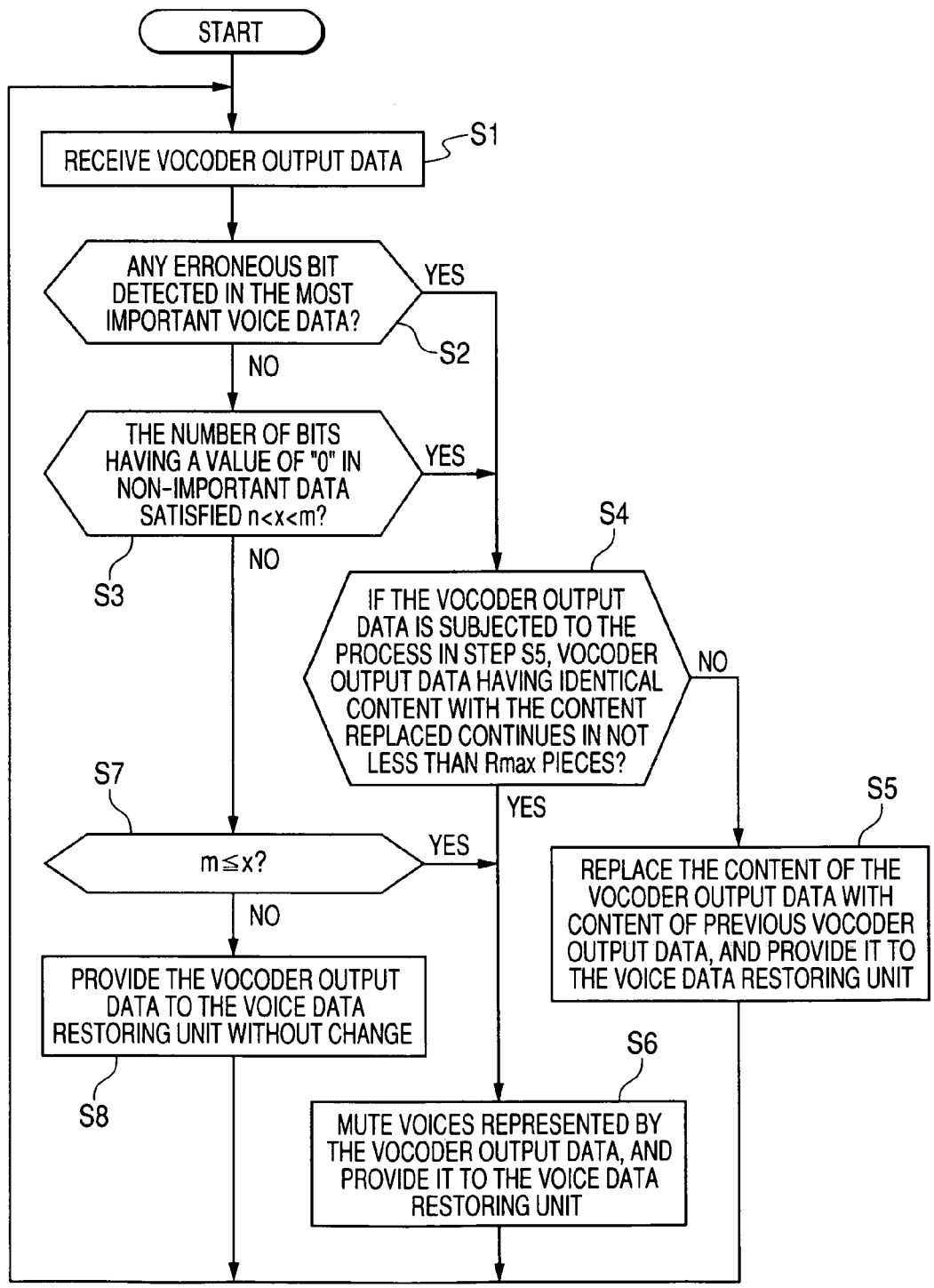
FIG. 8 is a flow chart showing a procedure of a process performed by the communication quality judging unit.

The communication quality judgment unit R5 receives the data corresponding to the vocoder output data provided by the deinterleaving process unit R4 performs a bad frame masking process on the data depending on the presence of an error in the most important voice data contained in the data and/or the number of abnormal bits contained in the protective data in the data, and provide it to the voice data restoring unit R6. Specifically, the communication quality judgment unit R5 performs, for example, processes whose procedure is shown in FIG. 8.

Specifically, once the communication quality judgment unit R5 receives a vocoder output data from the deinterleaving process unit R4 (step S1 in FIG. 8), it first uses error detection data contained in the frame to detect an erroneous bit in the most important voice data contained in the vocoder output data, and determines whether or not there is an erroneous bit (step S2). If it is determined that there is an error, the process proceeds to step S4.

On the other hand, if it is determined that there is no erroneous bit in step S2, the communication quality judgment unit R5 identifies how many bits have a value of "0" (incorrectly though it would normally have a value of "1") in the protective data in the vocoder output data received in step S1, and determines whether or not the identified number x satisfies the relationship (n<x<m) with respect to a predetermined lower limit n and a predetermined upper limit m (where n is an integer not less than 0, and m is an integer greater than n) (step S3). If it is determined that it is satisfied, the process proceeds to step S4.

In step S4, the communication quality judgment unit R5 determines whether or not "if the vocoder output data received in step S1 is subjected to the process in step S5 as described below, vocoder output data having identical content replaced with the content of previous vocoder output data continues in not less than predetermined Rmax pieces (where Rmax is a positive integer)," and performs a bad masking process depending on the determination (steps S5, S6) and returns the process to step S1.

Specifically, if it is determined in step S4 that not less than Rmax pieces of replaced vocoder output data having identical content does not continue after replacement, the communication quality judgment unit R5 replaces the content of the vocoder output data received in step S1 with content of previous vocoder output data that has been received immediately before the vocoder output data of interest (or that otherwise matches a predetermined condition) to provide it to the voice data restoring unit R6 (step S5), and returns the process to step S1.

On the other hand, if it is determined that greater than or equal to Rmax pieces of data continues, voices represented by the vocoder output data is muted and provided to the voice data restoring unit R6 (step S6), and the process returns to step S1. Specifically in step S6, the communication quality judgment unit R5 may, for example, destroy the vocoder output data, or may substantially destroy the content of the vocoder output data such as by changing the content of the vocoder output data such that it represents a silent state.

On the other hand, if it is determined in step S3 that the number x of bits having a value of "0" in the protective data does not satisfy the relationship (n<x<m), the communication quality judgment unit R5 determines whether or not the number x is not less than the upper limit m (step S7). If it is determined that it is greater than or equal to m, the process proceeds to step S6, and if it is determined that it is not greater than or equal to m (i.e. the number x is not more than the lower limit n), the vocoder output data received in step S1 is provided to the voice data restoring unit R6 without change as a proper vocoder output data, and the process returns to step S1.

It is considered that the number x of erroneous bits in the protective data is indicative of the poorness of communication quality of the transmission channel L. Therefore, given the value of x as a parameter indicative of the poorness of communication quality, it is considered that, in the process of the communication quality judgment unit R5 as shown in FIG. 8, the vocoder output data is ultimately processed according to the following conditions indicated as (C1) to (C5):

(C1) If no error is detected in the most important voice data and it is judged that the poorness x of communication quality is not more than the lower limit n, the vocoder output data is handled as proper.

(C2) If no error is detected in the most important voice data and it is judged that the poorness x of communication quality is larger than the lower limit n but not more than the upper limit m, the vocoder output data is handled as proper after it is replaced with content of previous vocoder output data.

(C3) The vocoder output data in which an error is detected in the most important voice data is also handled as proper after it is replaced with content of previous vocoder output data.

(C4) However, if there continue predetermined Rmax pieces of replaced vocoder output data that has matched (C2) or (C3) described above together with the number of vocoder output data used to replace the data, voices represented by subsequent vocoder output data that matches (C2) or (C3) are muted.

(C5) Even if no error is detected in the most important voice data, voices represented by the vocoder output data is muted if it is determined that the poorness of communication quality is greater than or equal to the upper limit m.

Supplied with vocoder output data finished with a bad frame masking process or proper vocoder output data from the communication quality judgment unit R5, the voice data restoring unit R6 converts encoded voice data consisting of the most important voice data and unprotected voice data contained in the vocoder output data to digital formatted voice data representative of sound waves indicated by the encoded voice data, and provides it to the voice output unit R7 with a known technique.

As a technique to convert encoded voice data to voice data, it is conceivable that, for example, a lookup table that describes correspondence between codes consisting of the encoded voice data and the voice data, and a database for the voice data are to be stored in advance, the lookup table is to be referenced to identify the voice data corresponding to the codes in the encoded voice data, and the identified voice data is to be read from the database and the like to combine with each other.

The voice output unit R7 is composed of, for example, a digital-to-analog (D/A) converter, an AF amplifier, a speaker, and the like.

Supplied with the digital formatted voice data from the voice data restoring unit R6, the voice output unit R7 generates a voice signal in an analog format by, for example, converting the voice data from digital to analog. The unit amplifies the voice signal and reproduces voices represented by the voice signal by causing the amplified voice signal to drive the speaker.

The reception device R performs operations as described above to receive the FSK modulated waves transmitted by the transmission device T and the like and reproduce voices represented by the FSK modulated waves.

The reception device R judges the communication quality of the transmission channel L based on the result from simple processes in which the number of data missing a predetermined value at the time when symbols are restored from the received FSK modulated waves among protective data having the predetermined value transmitted in the symbols by the transmission device T, and performs a bad frame masking process on the received data based on the judgment. Therefore, the reception device R can rapidly judge the communication quality of the transmission channel L with a simple construction even when there are a large number of bits in protective data. In addition, the number of bits in the protective data may be increased while simpleness and rapidness are ensured in the process of judging the communication quality, so that the communication quality may be judged accurately.

Additionally, in the FSK modulated waves transmitted by the transmission device T, as described above, there are two possible symbol values that may be taken by the symbol representative of data for the most important portion of encoded voice data and error detection data for it, while the interval between symbol values is substantially increased. Therefore, the reception device R provides for good restoration of these symbols.

The arrangement of the voice transmission and reception system is not limited to those described above.

For example, any portion composed of a processor among portions in the transmission device T and reception device R may be composed of a special purpose electronics instead of the processor. Additionally, any number of bits may be used for various data representative of voices as described above and error detection data.

Any rule may also be used to encode voices by the vocoder unit T2, which may further perform processes on the encoded voice data, such as the forward error correction (FEC). Additionally, the error detection data may not necessarily be composed of the CRC codes, and may be created by the check sum, parity codes and any other methods. Alternatively, error correction codes may be used instead of the error detection data.

In addition, the data to be transmitted may not necessarily be representative of voices, and any data may be used provided that it may be represented as a sequence of codes. Therefore, the data may be representative of, for example, images. The vocoder unit T2 may determine which portion of the data to be transmitted is handled as the most important portion, according to any criteria.

The voice input unit T1 may use any technique to obtain the data to be transmitted, and may be provided with a serial interface circuit such as the universal serial bus (USB), IEEE 1394, and Ethernet® so as to obtain, through the serial interface and the like, data that is externally transmitted in an serial manner. Alternatively, the voice input unit T1 may be provided with a recording media drive device such as a CD (compact disc)-ROM (read only memory) drive so as to read data from recording media that have recorded data to be transmitted.

The bad frame masking process performed by the communication quality judgment unit R5 may not also be limited to that described above, and therefore, for example, gains of voices represented by the vocoder output data applicable to (C2) or (C3) described above may be reduced. The attenuation ratio of voices in this case may be larger to a certain extent than, for example, the attenuation ratio applied to vocoder output data immediately before the vocoder output data whose gain is to be reduced, so that voices are reproduced in such a way that when vocoder output data having erroneous content continues, sound volume is reduced as the continuation becomes longer. If vocoder output data whose gain of voices has been reduced continues in a predetermined number of times, the communication quality judgment unit R5 may then mute voices represented by subsequent vocoder output data applicable to (C2) or (C3).

The data subjected to the bad frame masking process, which reduces gains, may not necessarily be limited to vocoder output data representative of voices, and the bad frame masking process may be performed on data representative of any variable having amplitude.

The conditions under which the communication quality judgment unit R5 performs the bad frame masking process may not be limited to those described above and may be arbitrarily specified. Therefore, for example, the number of erroneous bits in the protective data may be classified into four or more cases and each case may be subjected to a different bad frame masking process from each other. Alternatively, the communication quality judgment unit R5 may identify the number of correct bits in the protective data instead of the number of erroneous bits in the protective data, and may determine whether or not a bad frame masking process can be performed and/or determine the content of the bad frame masking process based on the identified number. Additionally, the number of erroneous bits or correct bits may not necessarily be identified for the entire protective data, and it may be identified for, for example, either of voice protective data or protective data for error detection data.

In addition, the communication quality judgment unit R5 may externally obtain parameters that define conditions for use in performing a bad frame masking process (for example, the upper limit m as described above) depending on user operation and the like. By externally obtaining the upper limit m depending on user operation, the reception device R may provide a function similar to squelch.

When the parameters are externally obtained, the communication quality judgment unit R5 may be provided with, for example, a switch, a keyboard, and other input devices for inputting the parameters. Alternatively, the unit may be provided with a serial interface circuit or recording media drive device to externally obtain serially-transmitted parameters or to read parameters recorded on the recording media.

The baseband signal may be representative of a symbol having more than four values. Additionally, a symbol value obtained by adding a redundant bit to data to be transmitted may not necessarily be the maximum or minimum value of multiple possible values, and it is sufficient to have the minimum value of the difference between symbol values of two symbols different from each other, which is larger than the minimum value in case of symbols created without an added redundant bit.

The symbol represented by the baseband signal may not necessarily be defined to make a series of Gray code when arranged in descending (or ascending) order in terms of the symbol value.

The modulated waves transmitted and received to and from the transmission device T and reception device R may not necessarily be the FSK modulated waves having Root Nyquist characteristics, and may have, for example, Gaussian and any other characteristics. Additionally, the modulated waves may represent in any manner a baseband signal generated by the baseband signal generating unit T4, and therefore, may be phase shift keying (PSK) modulated waves, for example.

The symbol judgment unit R3 in the reception device R may use one threshold to determine which one of two values (maximum and minimum values of normally possible four symbol values) is the symbol value in the section representative of a symbol to which a redundant bit is added.

The transmission channel L may not necessarily be provided with a packet network, and the transceivers TR1 and TR2 may transmit and receive modulated waves directly to and from each other (i.e. the transmission channel L may be a space through which electromagnetic waves propagate, or may consist of a communication line that directly connects the transceiver TR1 with the transceiver TR2). Alternatively, the transmission channel L may be composed of a network such as the Internet.

Although the embodiments according to the invention have been described, a baseband signal generating device according to the invention may be feasible using a conventional computer system without relying on a special purpose system.

For example, a program for operating the transmission device T described above may be installed from recording media (such as a CD-ROM and a flexible disc), which store the program, to a computer provided with a microphone, an AF amplifier, a sampler, an A/ converter, a high frequency amplifier, and the like, so that the transmission device T that performs processes described above may be arranged. Additionally, for example, a program for operating the reception device R described above may be installed from recording media (such as a CD-ROM and a flexible disc), which store the program, to a computer provided with a speaker, an AF amplifier, a D/A converter, a high frequency amplifier, and the like, so that the reception device R that performs processes described above may be arranged. Alternatively, a single computer may combine at least a portion of functions of the transmission device T and at least a portion of functions of the reception device R.

In addition, for example, these programs may be uploaded to a BBS on the communication lines to distribute them through the communication lines, or carrier waves may be modulated by a signal representative of these programs, resultant modulated waves may be transmitted, and the modulated waves may be demodulated by a device that has received the modulated waves to restore the programs.

These programs may then be started and executed similarly to other application programs under control of an OS to perform processes described above.

Alternatively, when an OS is responsible for a portion of the processes or the OS constitutes a portion of a component of the invention, the recording media may store the rest of the programs exclusive of such portion. In this case, it is intended in the invention that the recording media store a program for performing each function or steps that a computer is caused to perform.

INDUSTRIAL APPLICABILITY

According to the invention, a communication quality judging device, and the like, for accurately or rapidly judging the communication quality with a simple construction are provided, and therefore, they are advantageously applicable to a wireless communication system.

The invention claimed is:

1. A communication quality judging device comprising:
    a symbol judging means for obtaining a baseband signal representative of a sequence of multilevel symbols and judging the symbol represented by the baseband signal;
    a communication quality judging means for judging communication quality of a transmission channel over which the baseband signal has been transmitted, based on content of the symbol judged by the symbol judging means; and
    a data changing means for, if the communication quality judged by the communication quality judging means does not satisfy a predetermined condition, making a predetermined change to the data to be transmitted represented by the symbol used in the judgment,
    wherein at least a portion of a bit string is distinguished as a protected portion, the bit string constituting data to be transmitted represented by the sequence of symbols, and at least a portion of the symbol that belongs to the sequence of symbols contains a bit belonging to the protected portion and a redundant bit having a predetermined value, and
    wherein the communication quality judging means identifies the number of redundant bits having the predetermined value or the number of redundant bits missing the predetermined value among the redundant bits contained in the symbol that contains a bit belonging to the protected portion, and judges the communication quality of the transmission channel based on the identified result.

2. The communication quality judging device according to claim 1, wherein the data changing means comprises means for externally obtaining a parameter that defines at least a portion of the condition.

3. The communication quality judging device according to claim 1 or 2, wherein the predetermined change includes a process of substantially destroying the data to be transmitted represented by the symbol used to judge that the communication quality does not satisfy a predetermined condition.

4. The communication quality judging device according to claim 1 or 2, wherein the predetermined change includes a process of replacing the data to be transmitted represented by the symbol used to judge that the communication quality does not satisfy a predetermined condition, with previous data represented by a symbol previously obtained by the symbol judging means.

5. The communication quality judging device according to claim 4, wherein the predetermined change further includes a process of substantially destroying the data to be transmitted that follows last replaced data and that is represented by the symbol used to judge that the communication quality does not satisfy a predetermined condition, when more than a predetermined number of replaced data continues.

6. The communication quality judging device according to claim 1 or 2, wherein the data to be transmitted is composed of data representative of strength of a variable, and
    the predetermined change includes an attenuating process of changing the data to be transmitted represented by the symbol used to judge that the communication quality does not satisfy a predetermined condition, to a data equivalent in which the variable represented by the data is attenuated.

7. The communication quality judging device according to claim 6, wherein, when first data, which is transmitted immediately before second data to be subjected to the attenuating process, has been subjected to the attenuating process, the attenuating process provided to the second data consists of a process of changing the second data to a data equivalent in which the variable represented by the second data is attenuated at an attenuation ratio larger than that for the variable represented by the first data.

8. A communication quality judging method, the method comprising the steps of:
    obtaining a baseband signal representative of a sequence of multilevel symbols and judging the symbol represented by the baseband signal;
    judging communication quality of a transmission channel over which the baseband signal has been transmitted, based on content of the symbol judged in the symbol judging step; and
    changing data if the communication quality judged in the communication quality judging step does not satisfy a predetermined condition, to make a predetermined change to the data to be transmitted represented by the symbol used in the judgment,
    wherein at least a portion of a bit string is distinguished as a protected portion, the bit string constituting data to be transmitted represented by the sequence of symbols, and at least a portion of the symbol that belongs to the sequence of symbols contains a bit belonging to the protected portion and a redundant bit having a predetermined value, and
    wherein, in the communication quality judging step, the number of redundant bits having the predetermined value or the number of redundant bits missing the predetermined value is identified among the redundant bits contained in the symbol that contains a bit belonging to the protected portion, and the communication quality of the transmission channel is judged based on the identified result.

9. A computer program causing a computer to execute the steps of:

obtaining a baseband signal representative of a sequence of multilevel symbols and judging the symbol represented by the baseband signal;

judging communication quality of a transmission channel over which the baseband signal has been transmitted, based on content of the symbol judged in the symbol judging step; and changing data if the communication quality judged in the communication quality judging step does not satisfy a predetermined condition, to make a predetermined change to the data to be transmitted represented by the symbol used in the judgment, wherein at least a portion of a bit string is distinguished as a protected portion, the bit string constituting data to be transmitted represented by the sequence of symbols, and at least a portion of the symbol that belongs to the sequence of symbols contains a bit belonging to the protected portion and a redundant bit having a predetermined value, and wherein, in the communication quality judging step, the number of redundant bits having the predetermined value or the number of redundant bits missing the predetermined value is identified among the redundant bits contained in the symbol that contains a bit belonging to the protected portion, and the communication quality of the transmission channel is judged based on the identified result.

* * * * *